US005535139A

United States Patent [19]
Barringer et al.

[11] Patent Number: 5,535,139
[45] Date of Patent: Jul. 9, 1996

[54] PORTABLE FIBER OPTIC SPLITTER TOOL FOR MULTIMODE OPTICAL FIBER CABLE LINK

[75] Inventors: Wayne A. Barringer, Wappingers Falls; Casimer M. Decusatis, Poughkeepsie; Daniel J. Stigliani, Jr., Hopewell Junction, all of N.Y.

[73] Assignee: International Business Machines Corporation, Armonk, N.Y.

[21] Appl. No.: 222,754

[22] Filed: Apr. 4, 1994

[51] Int. Cl.$^6$ .................................................. H04B 10/08
[52] U.S. Cl. ........................ 364/550; 356/73.1; 356/432; 359/110
[58] Field of Search ................................. 356/73.1, 432; 359/110; 364/550

[56] References Cited

U.S. PATENT DOCUMENTS

| | | | |
|---|---|---|---|
| 2,500,547 | 3/1950 | Kalmus et al. | 356/432 |
| 3,544,224 | 12/1970 | Friedl | 356/432 |
| 4,850,698 | 7/1989 | Kordts et al. | 356/434 |
| 4,970,383 | 11/1990 | Caudle et al. | 250/216 |
| 4,973,169 | 11/1990 | Slonecker | 359/124 |

OTHER PUBLICATIONS

Troubleshooting Tools for Fiber–Optic Lans, *BYTE* Dec., 1993, p. 248.
Computer & Business Equipment Manufacturers Association, "Fibre Channel, Physical and Signaling Interface (FC–PH)", American National Standards Institute, Rev. 4.2, Oct. 8, 1993, pp. i–iv, 42–47, 300–306.

*Primary Examiner*—Edward R. Cosimano
*Attorney, Agent, or Firm*—Lawrence D. Cutter

[57] ABSTRACT

In a tool for measuring optical power on a fiber optic cable link, optical conditioning means in conjunction with a splitter are used to achieve measurement consistency and repeatability. In accordance with preferred embodiments of the present invention, light conditioning means are provided by disposing the optical fiber cable in a position so as to achieve mode filtering. This may be accomplished either by disposing the optical fiber in a coil, as for example in a mandrel, or disposing the coil in a series of serpentine or zig-zag paths.

15 Claims, 6 Drawing Sheets

PORTABLE FIBER OPTIC SPLITTER TOOL FOR MULTIMODE OPTICAL FIBER CABLE LINK

BACKGROUND OF THE INVENTION

The present invention is generally directed to a diagnostic tool for use in data processing and information transmission systems which communicate by means of optical fiber cable links. More particularly, the present invention is directed to a portable tool which is capable of consistent and reliable measurement of light power levels on optical fiber cables.

Because of their high capacity for information transmission, optical fiber links have become an important connection medium in data processing and information transmission systems. It is expected that the utilization of optical fiber links will continue to grow with increasing demand for higher bandwidth, especially as real time video transmission bandwidth needs become more significant. The improvements that have been made in optical fiber cables in recent years have also extended the distance over which information may be transmitted on such cables. This is a decidedly desirable result. However, the range requirements and other aspects of information transmission require the utilization of relatively powerful lasers to achieve the desirable information capacity and distance objectives. As a result of this and other factors, laser light emitted from one end of a fiber optic cable can pose known safety hazards. In particular, it is well known that such laser radiation may damage the human retina. Accordingly, in accordance with various standards, relating to the use of optical fibers in communication systems, it has become common practice to automatically shut down the laser transmission when the light path is interrupted. Typically, in relevant data transmission systems, optical fiber cables are disposed in duplex or multiplex fashion so that as soon as a light signal is interrupted at the receiving end, a shut down signal is sent back via other cable or cables to the originating information source to immediately shut down laser transmission. In the case of both fibers being interrupted, the lack of a return signal will also shut down the laser. Thus, when one "pulls the plug" at one end of a duplex fiber optic link, the utilization of at least one standard requires that the laser transmission cease. This provides a safety element which prevents laser radiation from impinging on biological tissues which might otherwise be damaged.

However, this safety requirement imposes a constraint which renders it exceedingly difficult to monitor the light power and/or to perform other diagnostic operations. In short, under a draft ANSI standard, its either "all or nothing" at one end of the fiber optic link. This standard is described as the open fiber control and is specified in the ANSI fiber channel standard document which specifies that the power is to be automatically turned off at the transmitter when the optical link is opened. This safety feature therefore prevents exposure to optical laser power levels that could be harmful that is, generally greater than international Class 1 limits. However, in order to isolate link problems and to perform maintenance, field service personnel need to measure optical transmitter output and receiver input levels. This would normally have to be done by breaking the link to perform the desired measurements. This is undesirable in that one or more of the processors is effectively idle during this period of time. Accordingly, there is a need to provide a portable tool for enabling the light characteristics to be measured during full link operation, in the face of the indicated safety requirements. The present invention is a tool particularly directed to solving this problem.

Optical splitters exist which are capable of "siphoning off" various percentages of light energy as it is transmitted down a fiber optic cable path. However, the use of commercially available optical splitters, even when disposed in a housing with stress relief, did not solve the problem of producing a usable portable tool. In fact, experiments conducted by one or more of the present applicants instead indicated a great deal of variability and inconsistency in the measured optical power level. Accordingly, the utilization of a simple splitter as a mechanism for providing optical energy for diagnostic purposes is not in and of itself acceptable. In particular, the present applicants have discerned that even simple movement or handling of the cable with the splitter, even in a housing with stress relief, still resulted in inconsistent measurements. Thus, a simple splitter, even one disposed in a stress relieved housing is an ineffective solution to the problem of measuring fiber optic light signals without interrupting the data flow provided by the optical signal.

While one form of the solution to the problem might be to place the fiber optic cables in a jig which holds them securely and prevents them from bending, moving or stretching in any way, such an arrangement is impractical and undesirable for a working portable tool. However, the applicants have perceived that the source of the problem is the sensitivity of the fiber optic cable to higher order mode re-distribution and loss which occur when the tool is used and/or handled. Additionally, splitters often use a fused biconic taper splice to strip off those light propagation modes nearer to the cladding of the optical fiber. These modes are in fact more-susceptible to fiber bending, micro bends, inclusions, micro scratches and other higher order mode re-distribution and loss. As a result of this, the present applicants have discerned that the unexpectedly high variability in optical power level measurements was in fact directly attributable to this sensitivity to higher order mode loss. Accordingly, the applicants herein have also discerned that the unexpectedly large variability can be corrected through the utilization of light conditioning. However, previously there was no indication of the need for any form of light conditioning in fiber optic cable applications which employ splitters.

SUMMARY OF THE INVENTION

In accordance with a preferred embodiment of applicants' invention, a tool for testing optical fiber cables comprises: at least one optical fiber cable; splitting means for accessing a portion of the light transmitted on the cable; and light conditioning means to attenuate higher order light propagation modes in the light which is accessed by the splitting means. More particularly, applicants employ light conditioning means in one of two forms. In one embodiment of the present invention, the light conditioning means includes a coiled fiber optic cable section preferably disposed around a mandrel or similar support to attenuate higher order light propagation modes. In such circumstances the radius of the bend around the support should be at least equal to the appropriate radius for the particular fiber optic cable being employed. In another embodiment of the present invention the light conditioning means comprises fiber optic cable disposed in a zig-zag path which also exhibits bends having at least the critical radius value for the fiber. It is a side benefit of both of these means for light conditioning that they provide stress relief for the optical fiber cables. This is particularly true for zig-zag optical fiber cable paths.

In another embodiment of applicants' invention, a data processing system comprises at least a first and second data processor linked by optical fiber connection means. Additionally, there is provided in this linkage at least one diagnostic tool disposed in the optical path. This tool, as described above, includes splitting means to access a portion of the light transmitted on the fiber optic cable and light conditioning means for attenuating higher order light propagation modes. Such systems are highly desirable since the fiber optic cables linking multiple processors may be many kilometers in length with the processors naturally being separated by a corresponding distance. Accordingly, particularly in its duplex form, the tool provided by the present invention allows testing of both the transmission and reception directions without the need for a service technician to travel the distance between processors.

Accordingly, it is an object of the present invention to provide a mechanism for measuring optical power levels in optical fiber cable links, while allowing normal link operation.

It is also an object of the present invention to provide a mechanism for measuring optical characteristics, including power levels, in fiber cable links.

It is also an object of the present invention to reduce the variability in measurements made on optical fiber cable links.

It is yet another object of the present invention to provide and enhance diagnostic capabilities in computer systems connected by fiber optic cables.

It is also an object of the present invention to render testing and maintenance of systems employing fiber optic cables easier for service and maintenance.

It is a still further object of the present invention to provide a mechanism for optical power measurements in fiber optic cable systems which are subject to safety standards requiring cessation of transmission when a link is broken.

It is also an object of the present invention to increase the availability (up-time) for data processing systems connected by optical fiber cables.

It is still another object of the present invention to insure the reliability of transmission between data processing elements connected by optical fiber cables.

Lastly, but not limited hereto, it is an object of the present invention to provide alternate stress relief mechanisms in fiber optic cables.

DESCRIPTION OF THE FIGURES

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
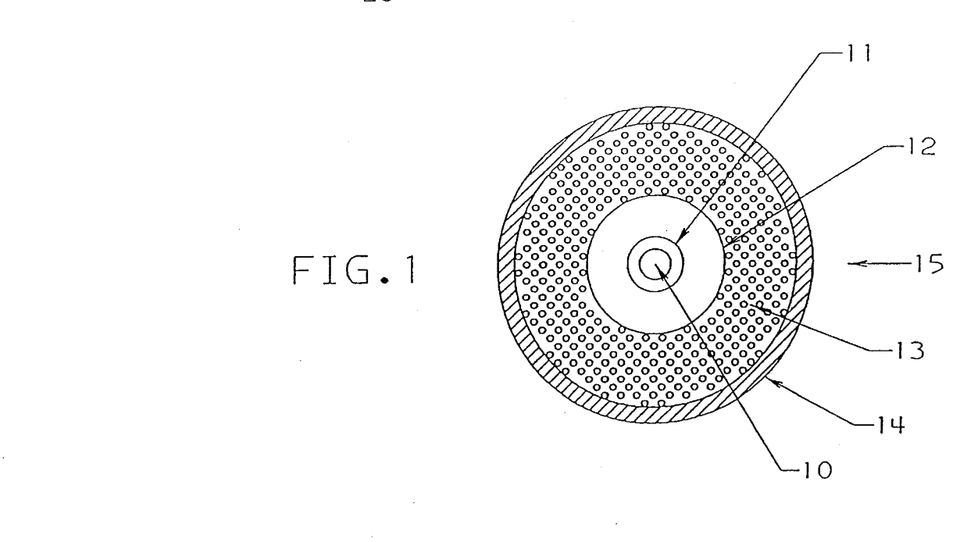
FIG. 1 is a cross-sectional view of an optical fiber cable such as may be used in conjunction with the present invention.

FIG. 1 illustrates a typical fiber optic cable 15 that may be employed in conjunction with the present invention. In particular, the cables include optical fiber 10 surrounded by coating 11 such as acrylate. Coating 11 is surrounded by tight buffer 12 which in turn is surrounded by an aramid fiber jacket 13 to provide strength. Lastly, the fiber optic cable 15 is provided with external jacket 14 which may comprise any convenient polymeric material. While FIG. 1 illustrates a preferred cable for use in conjunction with applicants' tool, it is noted that the essential aspect relevant thereto is the fact that optical fiber 10 is a multimode fiber.

Figure 2:
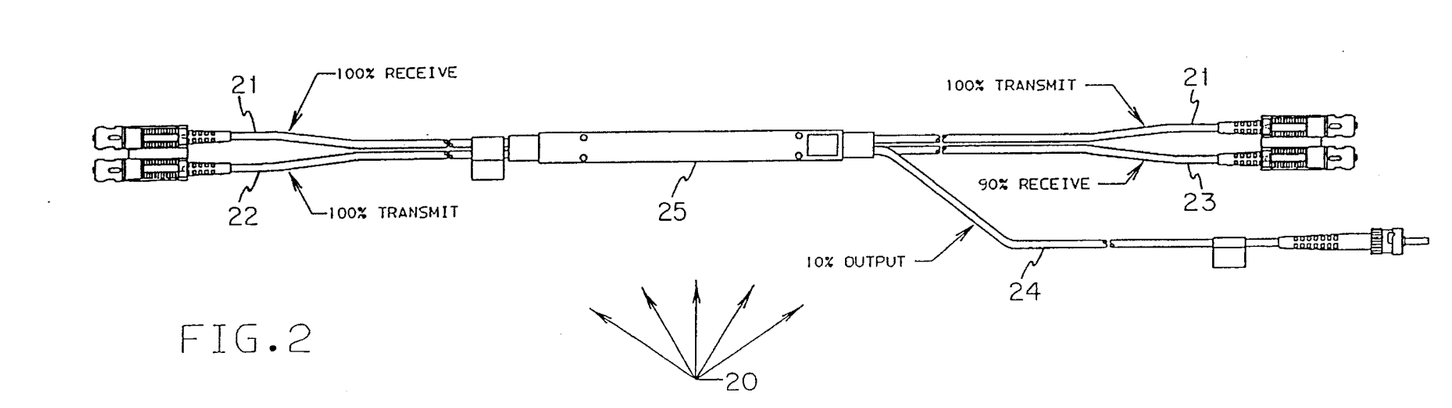
FIG. 2 is a side elevation view of a preferred embodiment of the tool of the present invention (except for the relative size of the housing)

FIG. 2 illustrates a preferred embodiment of the present invention. However, it is noted that housing 25 is preferably larger than is shown in FIG. 2 when provided with light conditioning means which are more particularly described below. Nonetheless, FIG. 2 illustrates the construction of tool 20 for monitoring optical power levels as they might occur in a duplex fiber optic cable arrangement. It is noted that while FIG. 2 shows only two simplex fiber optic cables, 21 and 22/23, and only one simplex cable 24 split from cable 22/23, there is nonetheless the possibility of providing multiple splitters and multiple cables some of which have splitters and some of which may not. However, in the preferred embodiment shown, cable 21 is described as being a 100% transmit and 100% receive cable. On the other hand, cable 22 is described as having 100% transmission at its input but with, only 90% of the optical power being supplied to fiber optic cable 23. The other 10% is split by means to be more particularly described below so as to supply the remaining 10% output signal power to fiber optic cable 24.

As indicated above, even with conventional strain relief mechanisms employed in housing 25 which also contains at least one splitting mechanism, there is nonetheless a decided inconsistency in the optical power readings measured on cable 24. Such measurement anomalies have been discerned to be caused by even slight movement of the cables and by placing the cable in various positions during utilization of an earlier version of the tool. In this regard, it should be kept in mind that tool 20 without light conditioning means it is very difficult to use in the field environment. In these environments, patch panels are often crowded with tightly spaced connections. While it may have been possible to reduce the variability by decreasing the length of the fiber optic cables to below some critical length, such a length is not known and even if it were known, the variabilities encountered in the field where the power measurements are performed would require pigtails lengths which were either too short or which had to be rigidly attached to an inflexible member which would prevent their bending and thus be impractical even though such rigidity might permit a more consistent optical power measurement.

Figure 3A:
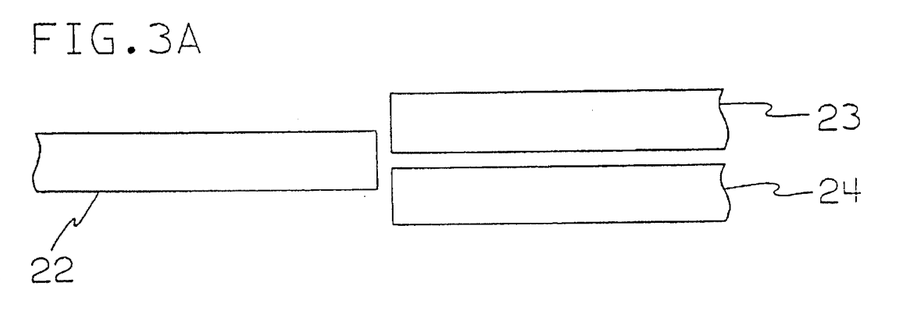
FIG. 3A illustrates an optical fiber splitting mechanism in which the optical power level is split substantially evenly between two output fibers via the mechanism of a misaligned mechanical splice.
Figure 3B:
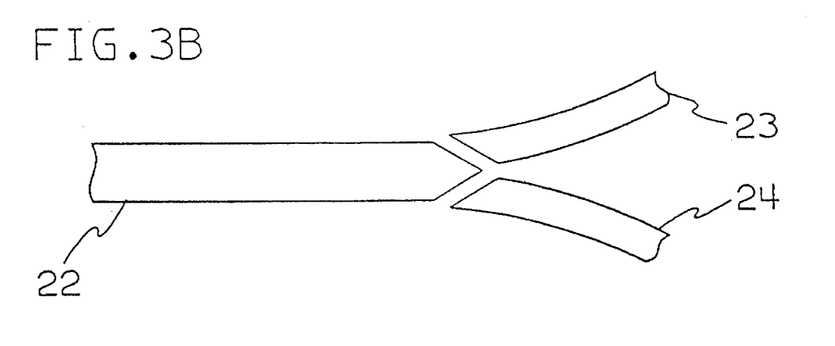
FIG. 3B illustrates an optical fiber splitting mechanism in which the optical power level is split substantially evenly between two optical fibers by means of a fused biconic taper splice.

FIGS. 3A and 3B illustrates two optical fiber splitter configurations. The splitter configuration shown in FIG. 3B employs a fused biconic taper splice to strip off higher light propagation modes which occur near the cladding of the optical fiber. Attenuation of these modes is more susceptible to fiber bending, microbends and other high order mode loss mechanisms. In the present invention, the various embodiments employed split these higher optical modes from the center of the fiber (known as mode mixing) to remove this sensitivity. In particular, FIG. 3B illustrates a fused biconic taper splice arrangement in which input optical fiber 22 supplies optical power equally to fibers 23 and 24.

Figure 3C:
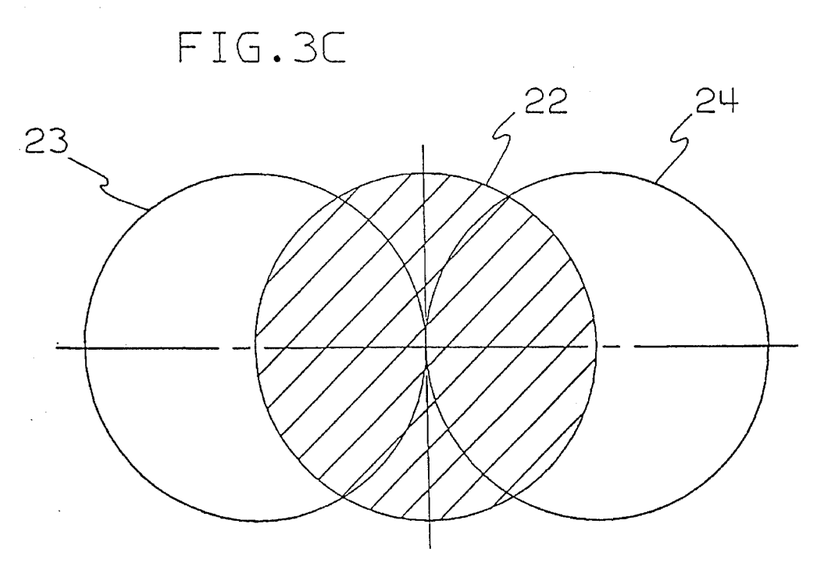
FIG. 3C illustrates misalignment loss in the situation of a substantially even split of light power between two fibers.

An alternative embodiment however may be employed which involves the use of a misaligned mechanical splice to provide the desired splitting. Such an arrangement is shown in FIG. 3A. As also seen from the cross-sectional end view in FIG. 3C, it should be appreciated that the misalignment of the fiber core also produces some loss due to poor coupling efficiency. However, this loss is a constant and can be corrected during the measurement process. However, for very long fiber optic cable links near the extreme end of their power budget, a tradeoff exists between the amount of acceptable excess loss and the performance of the link. Accordingly, for this reason misalignment based splitters are not a preferred embodiment in the present invention. However, such mechanical misalignment splicing does nonetheless also operate to strip modes thus allowing only lower order modes to pass through.

Figure 4A:
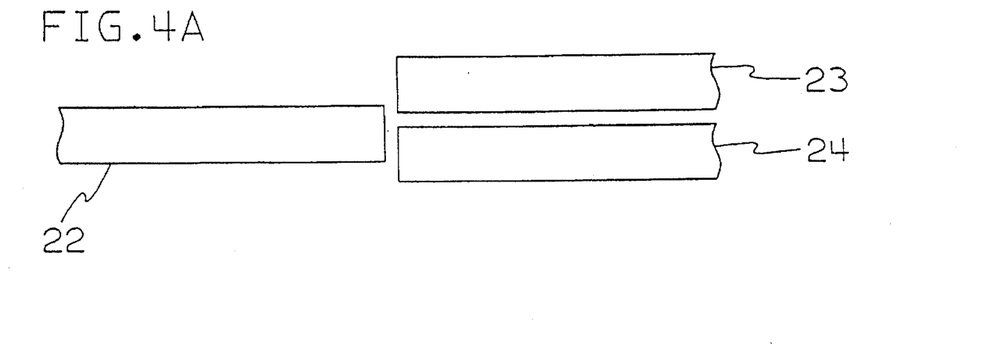
FIG. 4A is an illustration similar to FIG. 3A except that it more particularly shows mechanical configurations which may be employed in unequal light power splitting applications.
Figure 4B:
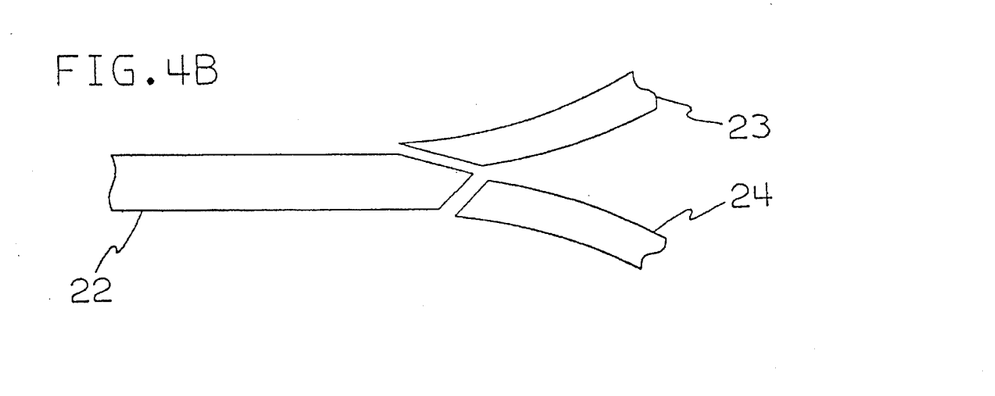
FIG. 4B is an illustration similar to FIG. 3B illustrating unequal light power splitting for biconic taper splices.
Figure 4C:
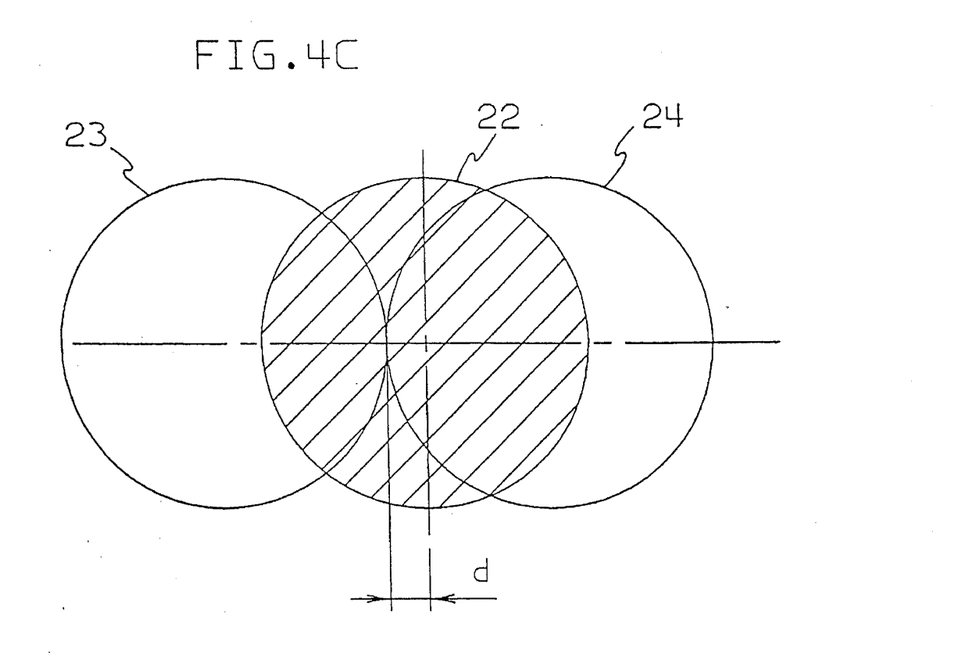
FIG. 4C is an illustration similar to FIG. 3C except that it more particularly shows misalignment loss in situations where there is unequal light power splitting.

However, in the present invention, equal power splitting is not a preferable approach. Accordingly, the splitting arrangements shown in FIGS. 4A and 4B are preferred for the present invention. In particular, FIG. 4B is similar to FIG. 3B illustrating a biconic taper splice in a fiber optic cable in which a relatively small portion of the optical power is supplied to "downstream" cable 23 with a correspondingly higher light power output being supplied to downstream cable 24. Accordingly, the splitter configuration shown in FIG. 4B is a preferred form of splitter used in the present invention. However, it is also noted that a mechanically misaligned cable splitter as illustrated in FIGS. 4A and 4C may also be employed. Although the loss of transmission efficiency, primarily because of the lack of congruent overlap, and connection loss is likely, this is a possible though less desirable alternative.

In accordance with preferred embodiments of the present invention, it has been found that it is necessary to provide light conditioning means 30 in conjunction with a splitter. In particular, as discussed above, the use of light conditioning means has been necessitated by the environment in which the tool of the present invention is typically employed. This environment contemplates frequent cable handling and motion. This environment also necessitates the use of relatively short (in comparison with the link distance) sections of optical fiber cable which are not only flexible but which are in fact often flexed in the normal course of use. In particular, the present invention employs means for removing higher light propagation modes either prior to the splitter or, less desirably, in a downstream position from the splitter on that portion of the cable which extracts the fractional signal from the main transmission cable.

Figure 5:
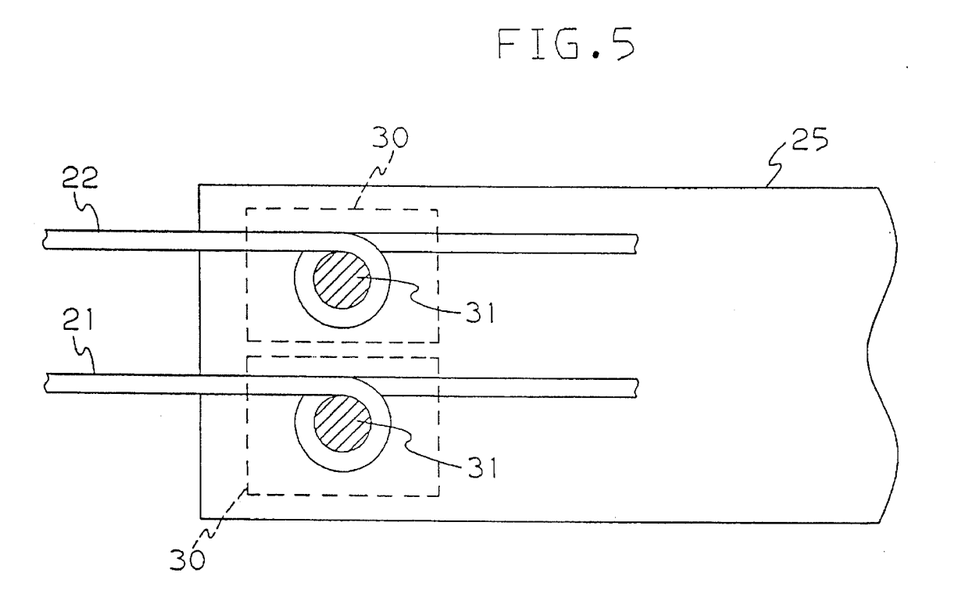
FIG. 5 is a side elevation view illustrating one form of light conditioning means in which fiber optic cables are disposed on a cylindrical mandrel.
Figure 6:
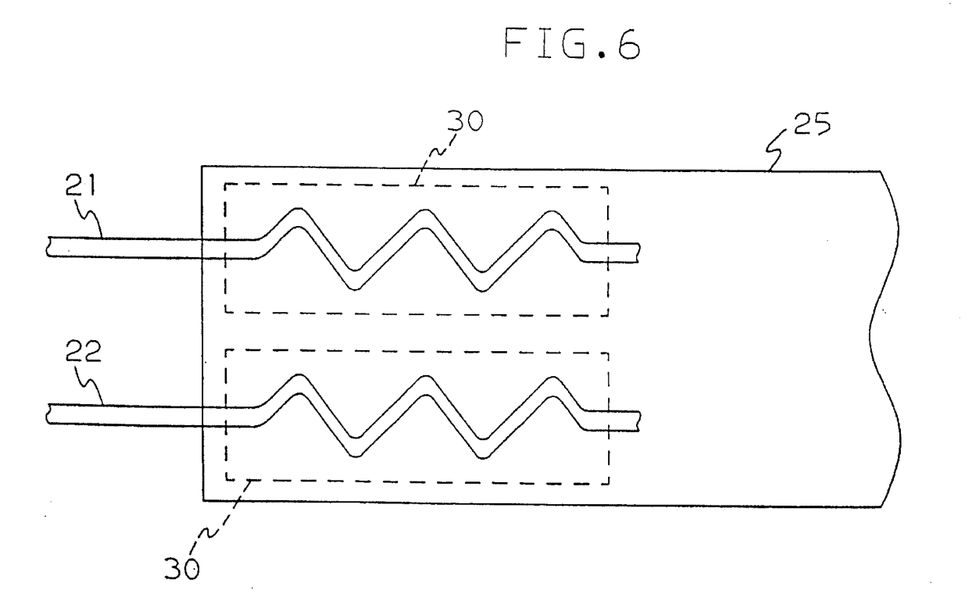
FIG. 6 is a side elevation view similar to FIG. 5 more particularly illustrating light conditioning means which are present in the form of zig-zag fiber optic cable paths.

In this regard, it is noted that FIGS. 5 and 6 describe two means for achieving the desired level of light conditioning. In a first environment shown in FIG. 5, fiber optic cables 21 and 22 are wound around a mandrel 31 so as to provide bending beyond the critical radius for the fiber optic cable. In particular, in one preferred embodiment of the present invention, the optical fiber coming into the splitter is wound at least three times around a mandrel whose radius is at least equal to the appropriate bend radius of the fiber. This approach is known to increase mode mixing by stripping off the higher order modes and redistributing the optical power uniformly among the remaining modes. With the higher order modes removed, the splitter measures optical power from the remaining modes which are not strongly susceptible to mode loss. Since mode loss can also be induced by pulling on the fiber, strain relief should also be employed in conjunction with the mandrel wrap to prevent losses induced by strain. This may be provided either by a rubber boot attached over the fibers as they emerge from housing 25 or by means of an attached aramid (for example) fiber strain relief inside the package as is presently employed in IBM's ESCON™ products (Enterprise System Connection Architecture as marketed by IBM Corporation, the assignee herein). However, it is noted that the use of mandrels 31 does provide by itself, a certain measure of strain relief.

FIG. 6 illustrates yet another mechanism by which a desirable degree of light conditioning may be provided. In particular, in the embodiment shown in FIG. 6 optical fiber cables 21 and 22 are disposed in a zig-zag fashion. Again, the radius of the bends is selected to be at least equal to the appropriate bend radius of the fiber. In order to achieve the zig-zag patterning, the fiber optic cables are preferably disposed in zig-zag or serpentine channels. Such channels have been employed in the past in ESCON™ products, though not however in conjunction with optical supports or for the purposes of performing optical power measurements.

Figure 7:
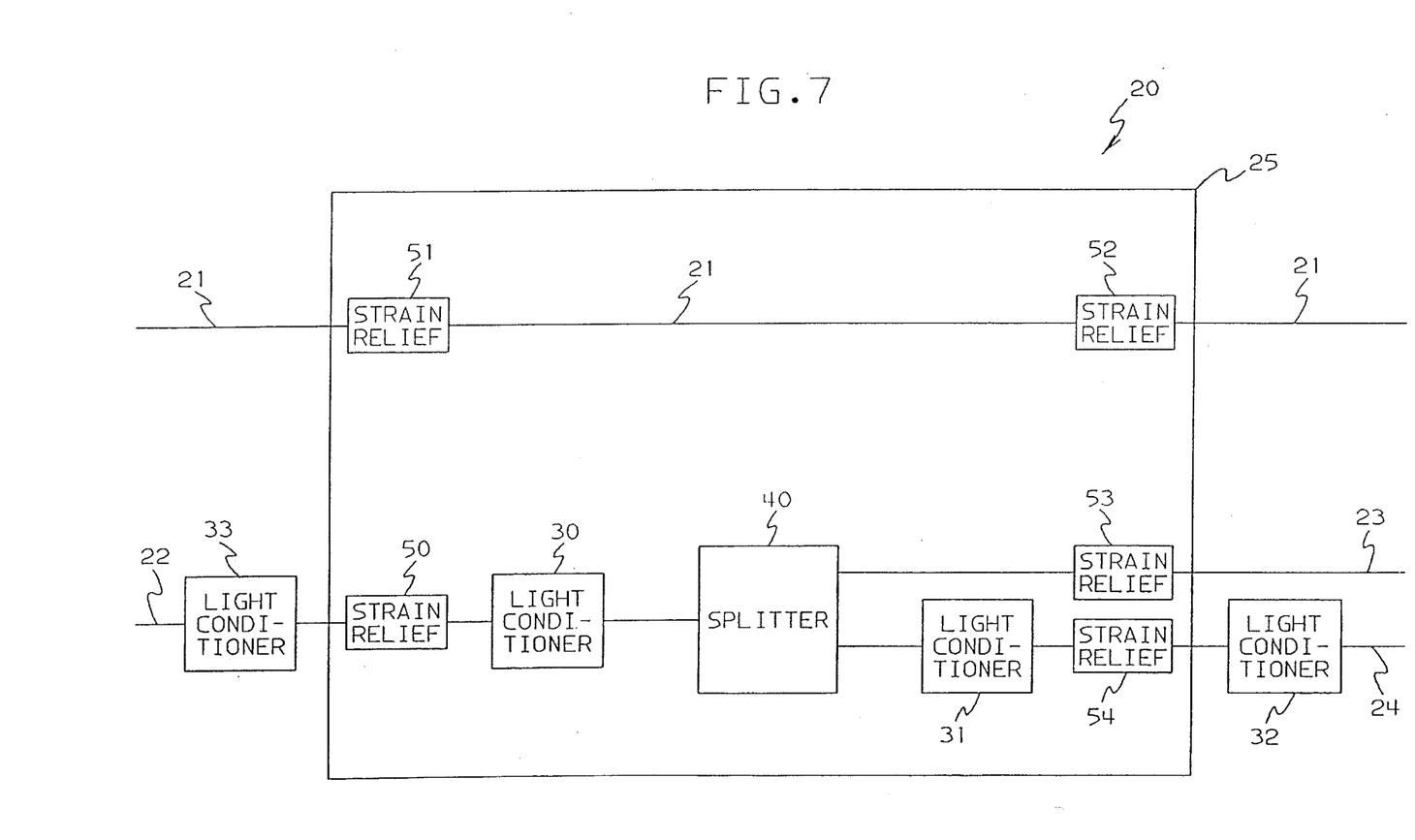
FIG. 7 is a combination side elevation and functional block diagram view illustrating various embodiments of the present invention, particularly those elements occurring within the housing.

FIG. 7 illustrates, in a functional and schematic fashion, various configurations that are possible in the present invention. The preferred embodiment of the present invention is discussed first. In particular, in such an embodiment, light conditioner 30 is disposed upstream of splitter 40 all of which is contained within housing 25 through which a second simplex optical fiber cable 21 is also provided, chiefly for convenience to produce the duplex light transmission capability typically seen in interconnected data processing systems and as discussed above with respect to safety issues. Alternatively, light conditioning means 31 may also be employed downstream of splitter 40 yet still be contained within housing 25. Alternatively, light conditioner 32 may be employed downstream of splitter 40 but outside of housing 25. In short, it is seen that a light conditioner may be employed in multiple positions (30, 31, 32) along the path of the light which is to be measured, including that shown by light conditioning means 33.

Particularly in the situation in which light conditioning means is provided by disposing the optical fiber cable in channels in a serpentine pattern in a jig, the necessity for strain relief, such as by strain relief means 50, is significantly less critical. However, since it is also nonetheless desirable to provide strain relief for fiber optic cable 21, strain relief means 50 and 51 may be constructed as a single combined strain relief unit. In short, strain relief means 50 and 51 may be provided by a single elastomeric boot structure surrounding fiber optic cables 21 and 22. Likewise, a single strain relief means may be provided by combining strain relief means 52, 53 and 54 at the other end of housing 25 for the relief of strain occurring on optical fiber cables 21, 23 and 24. However, it is noted that the preferred embodiment of the present invention is found within the utilization of light conditioner 30 splitter 40 and fiber optic cables 22, 23, and 24 and cable 21.

Figure 8:
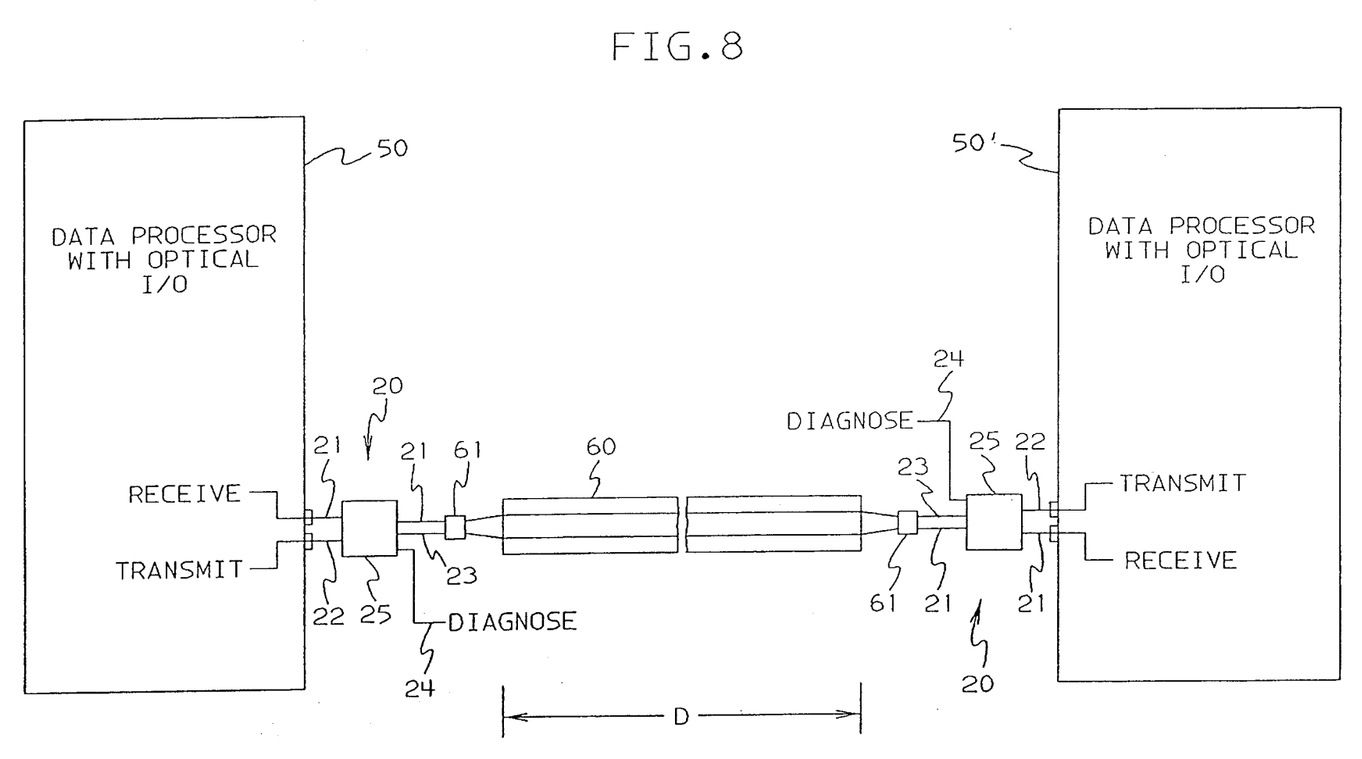
FIG. 8 is a functional block diagram illustrating the utilization of a tool of the present invention in an intended application with optically linked data processing systems.

The environment in which the present invention is employed is illustrated in FIG. 8. Therein there are shown two data processing systems 50 and 50' each having optical input/output (I/O) mechanisms. Such systems and/or subsystems are often connected with a duplex optical fiber connection (cable link) 60 extending for a relatively long distance D. D is typically on the order of a few kilometers or greater. Accordingly, providing a mechanism for determining optical power levels in this link is an important mission relevant to the functioning of the data processing systems. In the figure shown, there is provided tool 20 in accordance with the present invention disposed at both ends of optical fiber link 60. However in practice, it is possible to employ only a single such tool at only one link end. This may be accomplished simply by flipping the connections at both ends of the tool. In general, it is also desirable to employ tool 20 in a fashion such that light splitting occurs closest to the transmitting end of cable link 60. Accordingly, in operation, the present invention is readily inserted into link 60 via fiber optic connector 61. In this utilization, the link is opened temporarily, at which time safety standard features function to shut down transmission along the cable and permits the insertion of the tool with diagnostic lead 24 now available for performing optical power and other measurements. Nonetheless, while these measurements are being performed the link is still operable in its normal fashion.

From the above, it should be appreciated that the apparatus of the present invention provides a solution to the problem of measuring optical signal characteristics in information handling systems which are connected using fiber optic cables which automatically turn off when the link is broken. This shutdown of power is desirable for safety reasons, and particularly for reasons relating to optical safety. It should also be appreciated from the above, that simple splitting of a portion of the optical power from a fiber optic cable by itself is not sufficient to achieve the desired goals of measurement consistency. In order to provide a tool which provides a consistently measurable result, the present applicants have discerned that it is necessary to employ light conditioning means for the removal of higher order light propagation modes. The resulting optical signal is therefore rendered less susceptible to mode variation. This is also particularly desirable since it renders it easier to employ conventional fiber optic splitters having fused biconic tapered splices which are less susceptible to coupling losses.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A light splitting apparatus which is insertable at one end of an optical fiber link to provide stable access to light being transmitted through said optical fiber link, said apparatus comprising:

at least one optical fiber cable defining a light transmission path, said optical fiber cable being distinct from optical fiber cable used in said optical fiber link;

light splitting means disposed in said light transmission path for accessing a portion of light transmitted through said optical fiber link; and light conditioning means for attenuating higher order light propagation modes in said accessed light portion, said light conditioning means being disposed at a location selected from the group consisting of a location upstream of said light splitting means and a location downstream of said light splitting means, said upstream and downstream directions being determined relative to light propagation direction in said optical fiber link.

2. The apparatus of claim 1 in which the light conditioning means is disposed within the light path defined by said optical fiber cable so as to precede said splitting means in said light path.

3. The apparatus of claim 1 in which said splitting means produces substantially unequal mode distributions in optical fiber cables in the light paths subsequent to said splitting means.

4. The apparatus of claim 1 in which the split portion of light is approximately ten percent.

5. The apparatus of claim 1 in which the light conditioning means is disposed within the light path defined by said optical fiber cable so as to be disposed subsequent to said splitting means in said light path.

6. The apparatus of claim 5 in which said splitting means produces unequal mode distribution in optical fiber cables in the light paths subsequent to said splitting means and wherein said light conditioning means is disposed in that optical path, subsequent to said splitting means, which receives the lesser distribution.

7. The apparatus of claim 1 further including housing means for rigidly holding said splitting means and at least a portion of said optical fiber cable.

8. The apparatus of claim 7 further including at least one strain relief means for at least one end of said cable within said housing.

9. The apparatus of claim 8 in which at least one of said strain relief means is provided by said light conditioning means.

10. The apparatus of claim 1 in which said light conditioning means comprises a length of optical fiber cable disposed in a bent configuration.

11. The apparatus of claim 10 in which said light conditioning means is provided by disposing said optical fiber cable in a zig-zag pattern having a plurality of bends.

12. The apparatus of claim 10 in which said light conditioning means comprises optical fiber cable disposal in a coil configuration.

13. The apparatus of claim 12 in which said optical fiber cable is disposed in a helix on a mandrel to achieve the coil configuration.

14. A combination comprising:

a first data processor having optical input/output means;

a second data processor having optical input/output means;

at least one optical fiber link, connecting said first and second data processors, which provides an optical data communication path therebetween; and at least one diagnostic means disposed in said optical path, said diagnostic means including splitting means to access a portion of light transmitted on said optical fiber link and light conditioning means for attenuating higher order light propagation modes in said accessed light portion.

15. The combination of claim 14 in which said diagnostic means is disposed proximal to at least one of said data processors.

* * * * *